(12) United States Patent
Wolfgram et al.

(10) Patent No.: US 9,091,172 B2
(45) Date of Patent: Jul. 28, 2015

(54) ROTOR WITH COOLING PASSAGE

(75) Inventors: Christopher Wolfgram, Indianapolis, IN (US); David A. Otero, Carmel, IN (US); Daniel G. Smith, Hope, IN (US); Bill Westphal, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 579 days.

(21) Appl. No.: 13/335,708

(22) Filed: Dec. 22, 2011

(65) Prior Publication Data

US 2012/0177480 A1     Jul. 12, 2012

Related U.S. Application Data

(60) Provisional application No. 61/427,697, filed on Dec. 28, 2010.

(51) Int. Cl.
*F01D 5/08*     (2006.01)

(52) U.S. Cl.
CPC ............... *F01D 5/082* (2013.01); *F01D 5/081* (2013.01); *F01D 5/085* (2013.01); *Y02T 50/676* (2013.01)

(58) Field of Classification Search
USPC ........ 415/115, 116, 175, 176, 180; 416/90 R, 416/96 R
See application file for complete search history.

(56) References Cited

U.S. PATENT DOCUMENTS

| | | | |
|---|---|---|---|
| 3,647,313 A | 3/1972 | Koff | |
| 4,273,512 A | 6/1981 | Weiler | |
| 4,292,008 A * | 9/1981 | Grosjean et al. | 415/115 |
| 4,512,115 A | 4/1985 | Miller | |
| 4,657,482 A | 4/1987 | Neal | |
| 4,808,073 A | 2/1989 | Zaehring et al. | |
| 4,882,902 A | 11/1989 | Reigel et al. | |
| 4,961,309 A | 10/1990 | Liebl | |
| 5,405,245 A * | 4/1995 | Cornelius | 416/215 |
| 5,507,620 A | 4/1996 | Primoschitz et al. | |
| 5,611,197 A * | 3/1997 | Bunker | 60/806 |
| 5,700,130 A * | 12/1997 | Barbot et al. | 416/95 |
| 6,203,273 B1 | 3/2001 | Weiner et al. | |
| 6,267,553 B1 | 7/2001 | Burge | |
| 6,283,712 B1 | 9/2001 | Dziech et al. | |

(Continued)

FOREIGN PATENT DOCUMENTS

| | | |
|---|---|---|
| DE | 4324034 A1 | 1/1995 |
| EP | 1249578 A1 | 10/2002 |

(Continued)

OTHER PUBLICATIONS

International Search Report and Written Opinion, Apr. 24, 2012, PCT/US2011/067306.

(Continued)

*Primary Examiner* — Dwayne J White
*Assistant Examiner* — Justin Seabe
(74) *Attorney, Agent, or Firm* — Krieg DeVault LLP

(57) ABSTRACT

A gas turbine engine is disclosed having a cooling passage that rotates with a turbine and is capable of providing cooling flow to the turbine. In one embodiment the cooling passage can receive cooling flow from an interior of a shaft of the gas turbine engine and increase the pressure of the cooling flow before delivering it to a location near a blade of the turbine. In one form the cooling passage can have an inducer section. In one form the cooling passage can have internal vanes useful in increasing the pressure of the cooling flow.

24 Claims, 6 Drawing Sheets

(56) References Cited

U.S. PATENT DOCUMENTS

| | | | |
|---|---|---|---|
| 6,361,277 | B1 | 3/2002 | Bulman et al. |
| 6,390,771 | B1 | 5/2002 | Gervais et al. |
| 6,578,351 | B1 | 6/2003 | Modafferi |
| 6,672,072 | B1 | 1/2004 | Giffin, III |
| 7,370,787 | B2 | 5/2008 | Bacon et al. |
| 7,438,529 | B2 | 10/2008 | Fledersbacher et al. |
| 7,458,766 | B2 * | 12/2008 | Dailey et al. .................. 415/1 |
| 2002/0150470 | A1 | 10/2002 | Tiemann |
| 2002/0172591 | A1 | 11/2002 | Glynn et al. |
| 2008/0087023 | A1 | 4/2008 | Suciu et al. |
| 2008/0124210 | A1 | 5/2008 | Wayte et al. |
| 2008/0273982 | A1 | 11/2008 | Chunduru et al. |
| 2009/0324386 | A1 | 12/2009 | Takamura et al. |

FOREIGN PATENT DOCUMENTS

| | | |
|---|---|---|
| EP | 1533473 A1 | 5/2005 |
| EP | 1731717 A2 | 12/2006 |
| FR | 2892148 A1 | 4/2007 |
| GB | 2432636 A | 5/2007 |

OTHER PUBLICATIONS

European Patent Office, Supplementary Search Report issued in Application No. 11854244.8, dated Jun. 18, 2014, 6 pp.

* cited by examiner

ROTOR WITH COOLING PASSAGE

RELATED APPLICATIONS

The present application claims the benefit of U.S. Provisional Patent Application No. 61/427,697 filed Dec. 28, 2010 which is incorporated herein by reference.

GOVERNMENT RIGHTS

The present inventions were made with U.S. Government support under contract number N00019-04-C-0093 awarded by the United States Navy. The U.S. Government has certain rights in the present inventions.

TECHNICAL FIELD

The present invention generally relates to gas turbine engines, and more particularly, but not exclusively, to cooled components of gas turbine engines.

BACKGROUND

Providing cooling flow to turbomachinery components of gas turbine engines remains an area of interest. Some existing systems have various shortcomings relative to certain applications. Accordingly, there remains a need for further contributions in this area of technology.

SUMMARY

One embodiment of the present invention is a unique turbomachinery rotor having a cooling passage. Other embodiments include apparatuses, systems, devices, hardware, methods, and combinations for cooling turbines of gas turbine engines. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
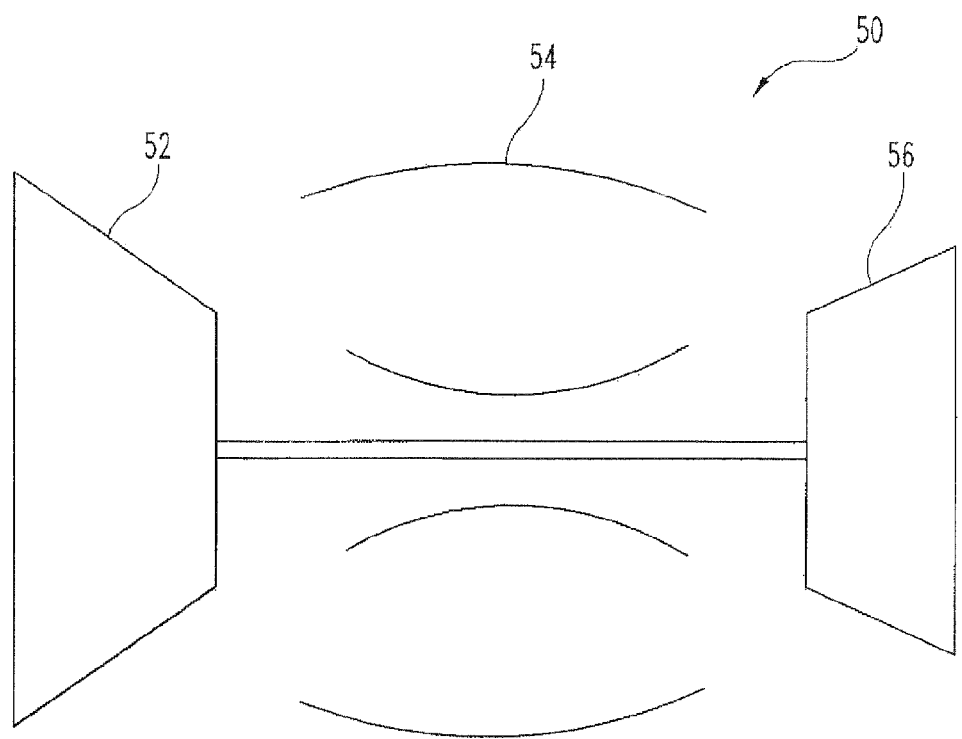
FIG. 1 depicts one embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, one form of a gas turbine engine 50 is disclosed having a compressor 52, combustor 54, and turbine 56. The compressor 52 is rotatingly coupled to the turbine 56. Though the gas turbine engine 50 is depicted as having a single spool, additional compressor and turbine sections can be added. For example, in one non-limiting embodiment the gas turbine engine 50 can include a high and low pressure turbine (HPT and LPT) and possible associated compressor sections. The gas turbine engine can take on many forms such as a turbojet, turboprop, and turbofan, to set forth just a few non-limiting examples. The gas turbine engine 50 can be an adaptive and/or variable cycle engine. In addition, the gas turbine engine 50 can be coupled with other types of power plants. In one form the gas turbine engine 50 can be used to provide power to an aircraft.

As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Figure 2:
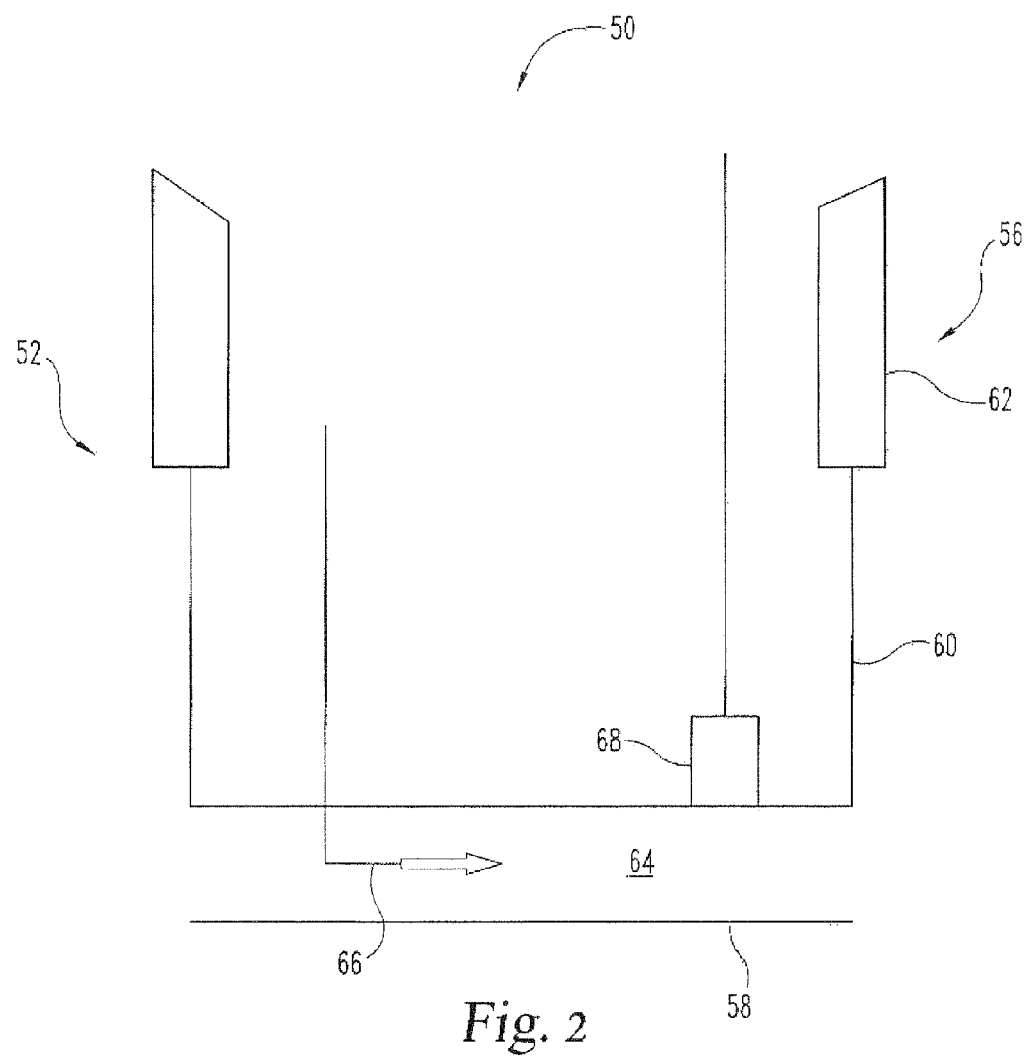
FIG. 2 depicts one embodiment of a gas turbine engine.

Turning now to FIG. 2, one embodiment of the gas turbine engine 50 is depicted. The compressor 52 is coupled to the turbine 56 via a shaft 58. The compressor 52 can be any one of a rotatable section used to increase total pressure of a fluid stream in the gas turbine engine 50. To set forth just a few non-limiting examples, the compressor 52 can be a fan or low pressure compressor. The turbine 56 includes a rotor 60 and blades 62 and is used to extract work from a flow of gas traversing the gas turbine engine 50. The rotor 60 is coupled to the shaft 58 and can be used to provide power to rotate the compressor 52, among other potential applications. The rotor 60 can be made from a variety of materials, and in one embodiment can be made from a variety of materials including, among others, nickel or titanium, and which can take the form of alloys if desired. The turbine 56 can be a turbine having multiple stages and/or can represent any of the turbines in a multi-spool gas turbine engine 50. Though only one rotor 60 and one row of blades 62 are depicted, in some embodiments the turbine 56 can have one or more rotors 60 and rows of blades 62.

The shaft 58 is rotatingly coupled with the compressor 52 and the turbine 56. In some embodiments the shaft 58 includes an internal passageway 64 for the passage of a cooling flow 66. The passageway 64 can have a variety of sizes and shapes and is capable of flowing the cooling flow 66 at a variety of rates. In one form the shaft 58 is a low pressure shaft of the gas turbine engine 50 and includes a hollow interior either along the entirety of the shaft 58 or a portion thereof. Though the cooling flow 66 is shown as entering the shaft 58 at a position intermediate the ends of the shaft 58, in some forms the cooling flow 66 can enter the shaft 58 through one of its ends, such as an axially forward end proximate the compressor 52.

The cooling flow 66 can originate from the flow stream downstream of the compressor 52. In some forms the cooling flow 66 can be bled or extracted from a flow of fluid through the compressor 52 using a variety of techniques. Where the compressor 52 includes multiple stages, the cooling flow 66 can originate upstream or downstream of any of the stages. For example, the cooling flow 66 can originate from an aft stage of a fan. In some forms the cooling flow 66 can originate from another source either internal or external to the gas turbine engine 50. To set forth just one non-limiting example, the cooling flow 66 can be air. In some applications the cooling flow 66 can be boosted in pressure by a device such as a pump or supplementary compressor, to set forth just a few possibilities. The cooling flow 66 can be used to cool a variety of turbomachinery components, an example of which is described further below.

The shaft 58 can be supported by a bearing 68 such that the rotor 60 overhangs the bearing 68. The bearing 68 can take a variety of forms such as mechanical bearings such as roller bearings or ball bearings, hydrodynamic bearings, and electromagnetic bearings, to set forth just a few possibilities. In some forms the gas turbine engine can be supported by one or more bearings whether or not located near the depicted bearing 68. In some embodiments the shaft 58 can extend axially aft past the rotor 60. In still other forms the shaft 58 can be extended axially aft past the rotor 60 and be supported by one or more additional bearings.

Figure 3:
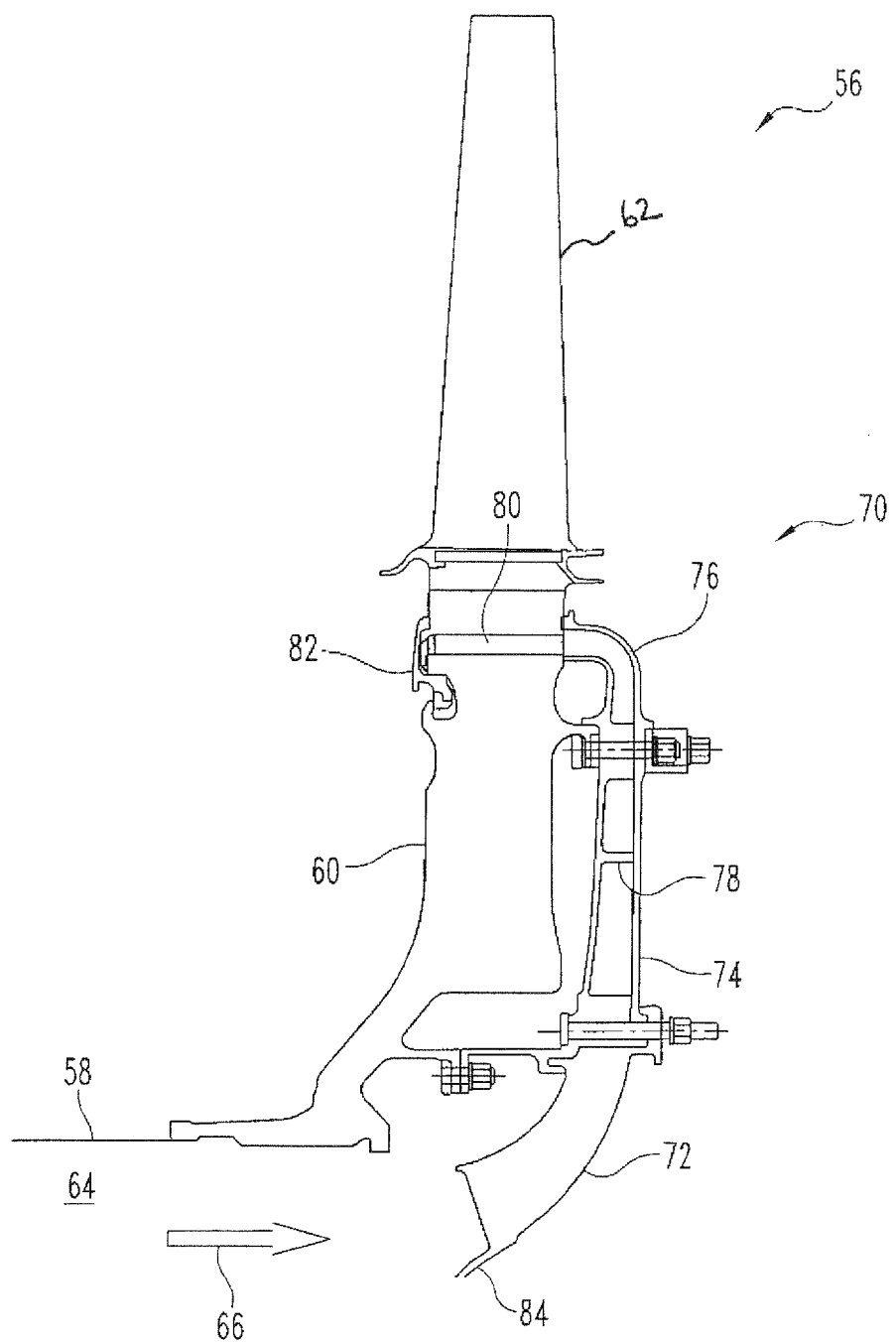
FIG. 3 depicts one embodiment of a turbine having a cooling passage.

Turning now to FIG. 3, a partial view of one embodiment of the rotor 60 and blade 62 is shown. The shaft 58 having the internal passageway 64 is shown coupled to the rotor 60. The rotor 60 includes a cooling passage 70 which is capable of receiving the cooling flow 66 from the shaft 58 and delivering the cooling flow 66 to a location near the blade 62. The cooling passage 70 can be located aft of the rotor 60, as depicted. In other embodiments the cooling passage 70 can be located forward of the rotor 60 to set forth just one non-limiting alternative location. In some embodiments the cooling passage 70 can be used to increase the pressure of the cooling flow 66 before delivering it to the location near the blade 62. In other forms the cooling passage 70 can be used to maintain the pressure of the cooling flow 66, to set forth just one non-limiting alternative. In one form the cooling passage 70 includes an upstream flow section 72, a midstream flow section 74, and downstream flow section 76. In other forms the cooling passage 70 can have fewer or greater numbers of flow sections. In still other forms some of the illustrated flow sections can be merged into one another. In short, the cooling passage 70 is not limited to the illustrated embodiment of FIG. 3.

The cooling passage 70 can include separate parts coupled to form the whole. Depicted in FIG. 3 is one embodiment of the cooling passage 70 formed from three components. The midstream flow section 74 and the downstream flow section 76 each are bounded by a common aft cover and forward cover. The forward cover of the illustrative embodiment includes a number of vanes 78 integral therein (discussed below). In other embodiments the vanes 78 can be separately positioned within the cooling passage 70, or can be integral with the aft cover. The upstream flow section 72 is a component that is fastened to the forward and aft covers of the midstream flow section 74 and the downstream flow section 76. Other variations and combinations of components can be used to create the cooling passage 70.

The upstream flow section 72 can be in the form of an inducer. The midstream flow section 74 can radially extend between the upstream flow section 72 and the downstream flow section 76. The downstream flow section can be used to turn the cooling flow 66 from a radially outward direction to an axial direction directed to the rotor 60 and/or blade 62. The cooling passage 70 can include a number of vanes 78 or other structure that assists in directing the cooling flow 66 and/or increasing a pressure of the cooling flow 66. In one non-limiting embodiment the cooling passage 70 can take the form of an integrated cooling air impeller.

In one form the upstream flow section 72, midstream flow section 74, and downstream flow section 76 are separate components that are assembled to form the cooling passage 70, one embodiment of which was discussed above. In some embodiments, however, one or more of the upstream flow section 72, midstream flow section 74, and downstream flow section 76 can be manufactured as a single component. For example, the midstream flow section 74 and downstream flow section 76 could be manufactured as a single unit and then coupled with the upstream flow section 72. In still other embodiments one or more of the upstream flow section 72, midstream flow section 74, and downstream flow section 76 can each be an assembly of separate components.

The cooling passage 70 can either be separately manufactured and connected to the rotor 60 and/or blade 62, but in other forms the cooling passage 70 can be integrally formed with one of the rotor 60 and/or blade 62 such as through a casting process, among potential others. The cooling passage 70 is shown mechanically coupled to the turbine 56 via a bolted assembly, but in other forms the cooling passage 70 can be affixed using different fastening techniques such as, but not limited to, bonding and welding. The cooling passage 70 can be made of a variety of materials including, among others, nickel or titanium, and which can take the form of alloys if desired. Some forms of the cooling passage 70 can be made entirely of one material type, while other forms of the cooling passage 70 can have portions made from different material types.

Figure 4:
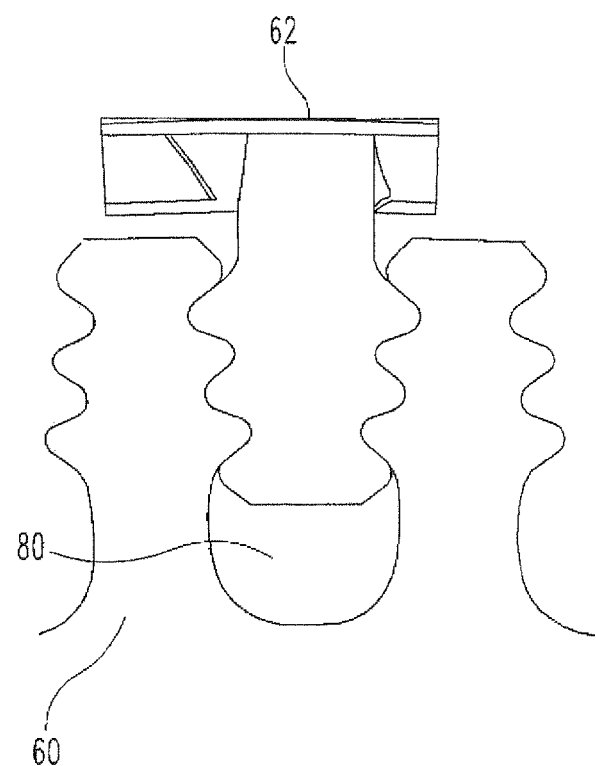
FIG. 4 depicts one embodiment of a blade coupled to a rotor.

Turning now to FIG. 4, and with continuing reference to FIG. 3, a view of one embodiment of a connection between the rotor 60 and blade 62 is shown. An onboard cooling passage 80 is formed between the blade 62 and the rotor 60. In some embodiments the onboard cooling passage 80 can be used to direct flow to a turbine blade 62 having internal cooling channels that may or may not vent cooling flow 66 through outlet holes or slots. In some applications a forward cover 82 can be used to close off the onboard cooling passage 80 so as to encourage the cooling flow 66 to be directed into the turbine blade 62. The forward cover 82 can be a separate component coupled to the turbine rotor 60. To set forth just one non-limiting example, the forward cover can be mechanically fastened to the rotor 60. In other embodiments the forward cover 82 can be formed with the rotor 60. Furthermore, the forward cover 82 can be made of a variety of materials, such as nickel or titanium, and which can take the form of alloys if desired.

The turbine rotor 60 and cooling passage 70 can be closed by a rear cover 84. The rear cover 84 could extend across the internal passageway 64 to enclose it and encourage the cooling flow 66 into the cooling passage 70 as opposed to permitting the cooling flow 66 to vent aft of the shaft 58. In some forms the rear cover 84 may not be present, such as during an intermediate stage of manufacturing to set forth just one example, or may have one or more holes/slots to permit some amount of cooling flow 66 to vent aft of the shaft 58. The rear cover 84 can be a separate component or can be made integral to any of the other portions, such as to the cooling passage 70 to set forth just one non-limiting example.

Figure 5:
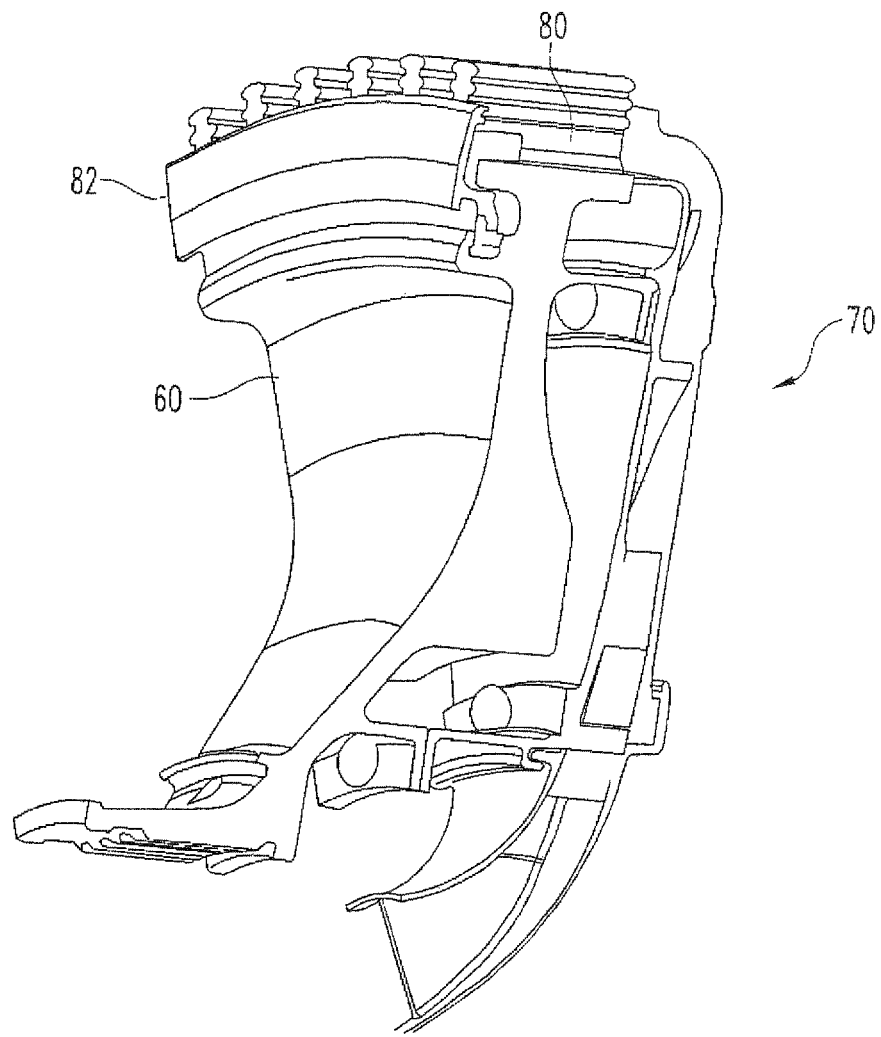
FIG. 5 depicts one embodiment of a rotor, a cooling passage, and cover.
Figure 6:
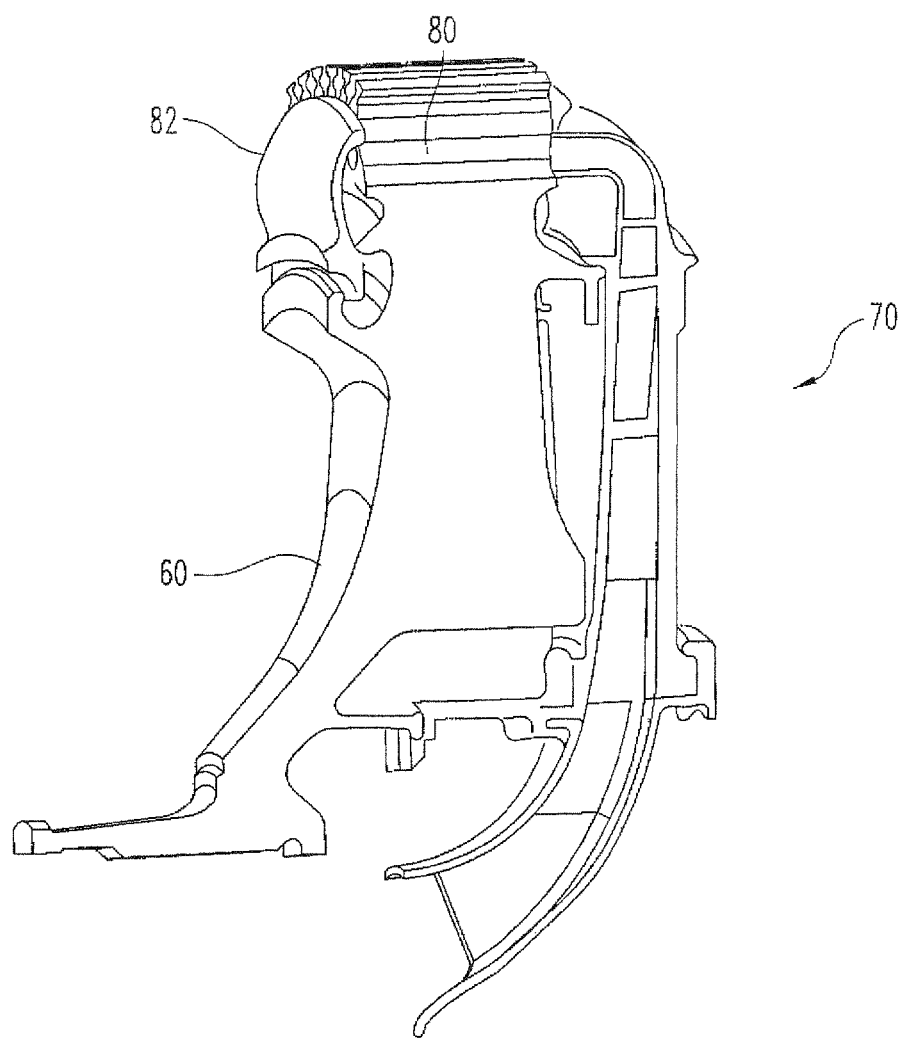
FIG. 6 depicts one embodiment of a rotor, a cooling passage, and cover.

FIGS. 5 and 6 depict two embodiments of the rotor 60 having the cooling passage 70 and covers 82. The blade 62 is not shown but it will be understood could be easily coupled. FIG. 5 depicts the rotor 60 having the following components of the cooling passage 70: an inner impeller, an impeller, and an aft coverplate. FIG. 6 depicts a single, integrated impeller with aft coverplate.

One aspect of the present application provides an apparatus comprising a gas turbine engine having a compressor rotatably coupled to a turbine with a spool shaft, a flow path formed internal to the spool shaft structured to provide a working fluid to the turbine, and a cooling flow path coupled to a turbine rotor and rotatable therewith, the cooling flow path having an inlet for receiving the working fluid from the flow path internal to the spool shaft and an outlet for delivering the working fluid to suppress temperatures of the turbine rotor.

One feature of the present application provides wherein the cooling flow path is structured to increase the pressure of the working fluid between the inlet and the outlet.

Another feature of the present application further includes an inducer that receives working fluid from the flow path internal to the spool shaft, the inducer structured to rotate with the cooling flow path.

Still another feature of the present application provides wherein the cooling flow path radially extends from an inner portion of the turbine rotor and is bounded by an axially forward cooling flow path portion and an axially aft cooling flow path portion.

Still yet another feature of the present application provides wherein the cooling flow path is coupled to an axially aft portion of the turbine rotor.

Yet still a further feature of the present application provides wherein the outlet of the cooling flow path provides the working fluid to a rim of the turbine rotor.

Yet another feature of the present application provides wherein the working fluid provided to the flow path formed internal to the spool shaft is taken from a flow stream downstream of a rotatable turbomachinery component.

Still yet a further feature of the present application provides wherein the turbine rotor is made from one of titanium, nickel, an alloy of titanium, and an alloy of nickel.

Another aspect of the present application provides an apparatus comprising a gas turbine engine having a turbine rotor that includes a plurality of blades disposed in a flow path of the gas turbine engine operable to extract work from a working fluid traversing the flow path, the turbine rotor having a passageway from an axial forward side to an axial aft side of the turbine rotor, a cooling flow path that rotates with the turbine rotor and receives cooling fluid from the passageway and delivers it to a location radially outward of the passageway.

One feature of the present application provides wherein the plurality of blades have a different coefficient of thermal expansion than the turbine rotor, and the turbine rotor is made from a titanium alloy.

Another feature of the present application provides wherein the cooling flow path includes components made from a titanium alloy, nickel alloy, or both.

Still another feature of the present application provides wherein the cooling flow path is mechanically fastened to the turbine rotor.

Yet still another feature of the present application provides wherein the cooling flow path is structured to increase the pressure of the cooling fluid delivered to the location of the turbine rotor.

A further feature of the present application provides wherein the cooling fluid is delivered to the cooling flow path via a spool shaft having an open interior, the spool shaft rotatably connecting the turbine rotor to a compressor.

A still further feature of the present application provides wherein the passageway of the turbine rotor is connected to the spool shaft.

Yet a further feature of the present application provides wherein the turbine rotor is cantilevered from a bearing disposed axially forward of the turbine rotor.

Still a further feature of the present application provides a passageway cover coupled to a radially outer portion of the turbine rotor and structured to close a passageway that extends from an axially aft portion of the turbine rotor to an axially forward portion of the turbine rotor.

Yet another aspect of the present application provides an apparatus comprising an internal combustion engine having a rotatable turbine used to extract work from a working fluid, and means for cooling the rotatable turbine.

A feature of the present application provides wherein the means for cooling includes means for flowing a cooling fluid from an upstream location in the gas turbine engine.

Yet still another aspect of the present application provides a method comprising operating a gas turbine engine to provide a flow of working fluid, conveying a cooling fluid internally within a rotatable shaft connected to a turbine of the gas turbine engine, and after the conveying, flowing the cooling fluid through an annular flow path of a rotor to a location radially outward of the rotatable shaft.

A feature of the present application further includes extracting a portion of the working fluid from a flow downstream of a compressor, the extraction forming the cooling fluid.

Another feature of the present application further includes directing the cooling fluid to flow internally within a blade connected to the rotor, the flowing including delivering the cooling fluid near a rim of the rotor.

Yet another feature of the present application further includes pressurizing the cooling fluid as a result of the flowing.

Still yet another feature of the present application further includes turning the cooling fluid from an axially aft direction to a radially outward direction, the turning occurring axially aft of the rotor.

A still further feature of the present application provides wherein the turning occurs with the rotation of the turbine.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a gas turbine engine having a compressor rotatably coupled to a turbine with a spool shaft;
   a flow path formed internal to the spool shaft structured to provide a working fluid to the turbine;
   a cooling flow path coupled to a turbine rotor and rotatable therewith, the cooling flow path having an inlet for receiving the working fluid from the flow path internal to the spool shaft and an outlet for delivering the working fluid to suppress temperatures of the turbine rotor;

wherein the cooling flow path radially extends from an inner portion of the turbine rotor and is bounded by an axially forward cooling flow path portion and an axially aft cooling flow path portion, the axially forward cooling flow path portion and axially aft cooling flow path portion being separate components from one another, and the axially forward cooling flow path portion and the axially aft cooling flow path portion separate from the turbine rotor and located on a common side of the turbine rotor; and wherein the cooling flow path is coupled to an axially aft portion of the turbine rotor.

2. The apparatus of claim 1, wherein the cooling flow path is structured to increase the pressure of the working fluid between the inlet and the outlet.

3. The apparatus of claim 2, which further includes an inducer that receives working fluid from the flow path internal to the spool shaft, the inducer structured to rotate with the cooling flow path.

4. The apparatus of claim 1, wherein the outlet of the cooling flow path provides the working fluid to a rim of the turbine rotor.

5. The apparatus of claim 1, wherein the working fluid provided to the flow path formed internal to the spool shaft is taken from a flow stream downstream of a rotatable turbomachinery component.

6. The apparatus of claim 1, wherein the turbine rotor is made from one of titanium, nickel, an alloy of titanium, and an alloy of nickel.

7. The apparatus of claim 1, which further includes a passageway cover coupled to a radially outer portion of the turbine rotor and structured to close a passageway that is fed with cooling air from the cooling flow path and the extends from an axially aft portion of the turbine rotor to an axially forward portion of the turbine rotor, the passageway cover located on an opposite side of the turbine rotor from the cooling passageway.

8. The apparatus of claim 1, wherein the flow path includes a flow path turn structured to change direction of the flow path from a radial direction to an axial direction, and wherein the a flow path turn is at the same radial height as the outlet.

9. An apparatus comprising:
a gas turbine engine having a turbine rotor that includes a plurality of blades disposed in a flow path of the gas turbine engine operable to extract work from a working fluid traversing the flow path, the turbine rotor having a first passageway from an axial forward side to an axial aft side of the turbine rotor;
a cooling flow path that rotates with the turbine rotor and receives cooling fluid from the first passageway and delivers it to a location radially outward of the passageway at a delivery radial station;
wherein the cooling flow path radially extends from an inner portion of the turbine rotor and is bounded by an axially forward cooling flow path portion and an axially aft cooling flow path portion, the axially forward cooling flow path portion and the axially aft cooling flow path portion located on an aft side of the turbine rotor, the axially forward cooling flow path portion and the axially aft cooling flow path portion offset from the turbine rotor;
wherein the cooling flow path turns the flow from a radial direction to an axial direction prior to delivering the cooling fluid to the location, the flow path turned at the delivery radial station of the location; and wherein the axially forward cooling flow path portion and axially aft cooling flow path portion are separate components that have been fastened to one another.

10. The apparatus of claim 9, wherein the plurality of blades have a different coefficient of thermal expansion than the turbine rotor, and the turbine rotor is made from a titanium alloy.

11. The apparatus of claim 9, wherein the cooling flow path includes components made from a titanium alloy, nickel alloy, or both.

12. The apparatus of claim 9, wherein the cooling flow path is mechanically fastened to the turbine rotor.

13. The apparatus of claim 12, wherein the cooling flow path is structured to increase the pressure of the cooling fluid delivered to the location of the turbine rotor.

14. The apparatus of claim 13, wherein the cooling fluid is delivered to the cooling flow path via a spool shaft having an open interior, the spool shaft rotatably connecting the turbine rotor to a compressor.

15. The apparatus of claim 14, wherein the first passageway of the turbine rotor is connected to the spool shaft.

16. The apparatus of claim 9, wherein the turbine rotor is cantilevered from a bearing disposed axially forward of the turbine rotor.

17. The apparatus of claim 9, which further includes a passageway cover coupled to a radially outer portion of the turbine rotor and structured to close a second passageway that extends from an axially aft portion of the turbine rotor to an axially forward portion of the turbine rotor, the passageway cover located on an opposite side of the turbine rotor from the cooling flow path.

18. A method comprising:
operating a gas turbine engine to provide a flow of working fluid;
conveying a cooling fluid internally within a rotatable shaft connected to a turbine of the gas turbine engine, the cooling fluid traversing from an upstream side of a rotor to a downstream side of a rotor during the conveying; and
after the conveying, flowing the cooling fluid through an annular flow path having an axially forward portion coupled to an axially aft portion which are both located on the downstream side and offset from a rotor, the flowing proceeding to a location radially outward of the rotatable shaft where it is turned to flow axially before encountering a blade of the turbine.

19. The method of claim 18, which further includes extracting a portion of the working fluid from a flow downstream of a compressor, the extraction forming the cooling fluid.

20. The method of claim 18, which further includes directing the cooling fluid to flow internally within a blade connected to the rotor, the flowing including delivering the cooling fluid near a rim of the rotor.

21. The method of claim 18, which further includes pressurizing the cooling fluid as a result of the flowing.

22. The method of claim 18, which further includes turning the cooling fluid from an axially aft direction to a radially outward direction, the turning occurring axially aft of the rotor.

23. The method of claim 22, wherein the turning occurs with the rotation of the turbine.

24. The apparatus of claim 18, which further includes covering a radially outer portion of the rotor such that the cover closes a passageway that is fed with cooling air from the annular flow path, the covering located on an opposite side of the rotor from the annular flow path.

\* \* \* \* \*